T. D. Keith.
Rock Drill.
Nº 89,932. Patented May 11, 1869.
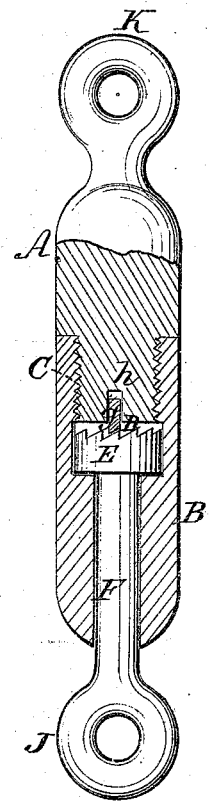
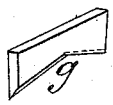
Witnesses.
Gustave Dieterich.
Oscar Hinchman.
Inventor.
T. D. Keith.
per Munn & Co.
Attys.

United States Patent Office.

T. D. KEITH, OF MAYVILLE, WISCONSIN, ASSIGNOR TO HIMSELF AND E. J. DAHM, OF THE SAME PLACE.

Letters Patent No. 89,932, dated May 11, 1869.

IMPROVEMENT IN OPERATING DRILLS.

The Schedule referred to in these Letters Patent and making part of the same

*To all whom it may concern:*

Be it known that I, T. D. KEITH, of Mayville, in the county of Dodge, and State of Wisconsin, have invented a new and useful Improvement in Operating Drills; and I do hereby declare that the following is a full, clear, and exact description thereof, which will enable others skilled in the art to make and use the same, reference being had to the accompanying drawings, forming part of this specification.

This invention relates to a new and useful improvement in operating drop-drills in the process of drilling through rock, earth, or other material in artesian wells or other kinds of earth-boring; and consists in attaching to the drill-rope or ropes, a ratchet-swivel for rotating or turning the drills, as will be hereinafter more fully described.

In the accompanying drawing—

Figure 1 represents a longitudinal sectional view of the device, showing the method of its construction and operation.

Figure 2 represents the loose plate, or pawl, hereinafter referred to.

Similar letters of reference indicate corresponding parts.

A and B represent two cylindrical or other-shaped metallic pieces, which are connected together by screw-threads, as seen at C.

D is a chamber in the part B, beneath the screw.

E is a swivel-head on the shank F, which is confined and allowed to rotate in the chamber D. The face of the head E is serrated, or ratchet-teeth are cut thereon, as seen in the drawing.

$g$ is a drop-pawl, which works in the slot $h$ in the part A.

It will be seen that when the swivel-head turns in one direction, (or to the left,) the pawl will be raised and the swivel will be allowed to rotate. The pawl will prevent the swivel from turning in the other direction.

The whole arrangement forms a swivel for the rope, the lower rope being attached to the eye J, and the upper portion to the eye K.

Raising the drill causes the rope to twist, which turns the drill about one-fourth of a revolution. When the drill drops, the rope is slackened, allowing it to burst or spring back, and is held in position by the pawl, which drops and engages with the ratchet-teeth.

It will thus be seen that the position of the drill-edge will be changed at every stroke, thereby greatly increasing its efficiency.

The lower portion of the rope should be sufficiently long to allow of its proper action in twisting and untwisting, and is of course placed in regard to its twist so as to correspond with the teeth of the ratchet.

Having thus described my invention,

I claim as new, and desire to secure by Letters Patent—

A ratchet-swivel, placed between two ropes, so constructed and arranged as to act and to automatically turn a drill, substantially as herein shown and described.

T. D. KEITH.

Witnesses:
CHARLES ALLEN,
J. H. ANDREW.